United States Patent
Lee et al.

(10) Patent No.: US 9,783,161 B2
(45) Date of Patent: Oct. 10, 2017

(54) VEHICLE AND CONTROL METHOD THEREOF

(71) Applicant: Hyundai Motor Company, Seoul (KR)

(72) Inventors: Jongyoung Lee, Gyeonggi-do (KR); Jihye Lee, Gangwon-do (KR); Sinjung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/139,696

(22) Filed: Apr. 27, 2016

(65) Prior Publication Data

US 2017/0129457 A1    May 11, 2017

(30) Foreign Application Priority Data

Nov. 10, 2015 (KR) .......... 10-2015-0157162

(51) Int. Cl.
| | |
|---|---|
| *B60R 25/24* | (2013.01) |
| *H04L 29/08* | (2006.01) |
| *H04L 29/06* | (2006.01) |
| *G07C 9/00* | (2006.01) |

(52) U.S. Cl.
CPC .......... *B60R 25/241* (2013.01); *B60R 25/248* (2013.01); *G07C 9/00182* (2013.01); *H04L 63/0876* (2013.01); *H04L 67/12* (2013.01); *G07C 2009/0019* (2013.01); *G07C 2009/00222* (2013.01); *G07C 2009/00277* (2013.01)

(58) Field of Classification Search
CPC ............ G07C 9/00111; G07C 9/00309; G07C 2009/00793; G07C 9/00103; G07C 9/00571; G07C 9/00182; G07C 2009/00634

USPC ......................................................... 340/5.7
See application file for complete search history.

(56) References Cited

U.S. PATENT DOCUMENTS

| | | | |
|---|---|---|---|
| 6,850,252 B1 * | 2/2005 | Hoffberg ............ | G06K 9/00369 348/E7.061 |
| 8,112,066 B2 * | 2/2012 | Ben Ayed ............ | G06Q 20/108 455/41.1 |
| 2007/0224967 A1 | 9/2007 | Kashiyama et al. | |

FOREIGN PATENT DOCUMENTS

| | | | |
|---|---|---|---|
| JP | 2006016770 A | * | 1/2006 |
| JP | 2006-341734 A | | 12/2006 |
| JP | 2007-532369 A | | 11/2007 |
| JP | 2012-056343 A | | 3/2012 |
| JP | 2015-131608 A | | 7/2015 |

(Continued)

OTHER PUBLICATIONS

Notice of Allowance from Korean intellectual Property Office for Korean Patent Application No, 10-2015-0157162, dated Apr. 27, 2017, English translation, 1 page.

*Primary Examiner* — Mark Blouin
(74) *Attorney, Agent, or Firm* — Mintz Levin Cohn Ferris Glovsky and Popeo, P.C.; Peter F. Corless

(57) ABSTRACT

A vehicle includes: a Low Frequency (LF) communication unit transmitting an authentication request signal to a smart key through an LF communication network; a Radio Frequency (RF) communication unit receiving an authentication response signal from the smart key through an RF communication network; and a controller measuring an authentication response time period based on a time at which the authentication request signal is transmitted and a time at which the authentication response signal is received and determining whether authentication with the smart key is successful based on the authentication response time period.

20 Claims, 9 Drawing Sheets

(56) References Cited

FOREIGN PATENT DOCUMENTS

KR 10-0901059 B1 6/2009
KR 10-1476432 B1 12/2014

* cited by examiner

100

VEHICLE AND CONTROL METHOD THEREOF

CROSS-REFERENCE TO RELATED APPLICATION

This application claims the benefit of and priority to Korean Patent Application No. 10-2015-0157162, filed on Nov. 10, 2015 in the Korean Intellectual Property Office, the disclosure of which is incorporated herein in its entirety by reference.

BACKGROUND

1. Technical Field

Embodiments of the present disclosure relate generally to a vehicle and a control method thereof, and more particularly, to a vehicle and a control method thereof capable of detecting a hacking attempt based on a communication delay with a smart key.

2. Description of the Related Art

A smart key system for a vehicle enables a driver to, for example, open or close doors of a vehicle and start the vehicle from a remote location, without having to insert a key into a key box or to perform specific manipulation for starting the vehicle, such as inserting a key into an ignition. The smart key system typically uses a smart card or a smart key, such as a FOB key, for wireless communication. If a driver possessing such a smart key approaches a vehicle, the vehicle is automatically unlocked through Low Frequency (LF) communication and Radio Frequency (RF) communication with the smart key, so that the driver can open the doors of the vehicle without inserting a key into the ignition and also can start the vehicle without inserting the key after driving the vehicle.

The smart key system can perform an operation of transmitting an authentication request signal (e.g., a LF frequency band) for detecting a smart key and an operation of receiving an authentication response signal (e.g., an RF frequency band) transmitted from the smart key. In this case, since the LF signal having a relatively lower frequency band than the RF signal has limitation in transmission distance, the vehicle can receive an authentication response signal from the smart key only when the smart key exists close to the vehicle.

Problematically, recent hacking into radio signals has resulted in the collection of authentication request signals transmitted from a vehicle through an antenna or the like around the vehicle. Hacking has also resulted in improperly transferring authentication request signals to another smart key located at a distant location away from the vehicle.

SUMMARY

An aspect of the present disclosure provides a vehicle which is capable of detecting a hacking attempt based on a communication delay time for communication with a smart key, and intercepting hacking in order to prevent hacking into radio signals, in a smart key system, and a method of controlling the vehicle. Additional aspects of the disclosure will be set forth in part in the description which follows and, in part, will be apparent from the description, or may be learned by practice of the disclosure.

In accordance with embodiments of the present disclosure, a vehicle includes: a Low Frequency (LF) communication unit transmitting an authentication request signal to a smart key through an LF communication network; a Radio Frequency (RF) communication unit receiving an authentication response signal from the smart key through an RF communication network; and a controller measuring an authentication response time period based on a time at which the authentication request signal is transmitted and a time at which the authentication response signal is received and determining whether authentication with the smart key is successful based on the authentication response time period.

The controller may determine whether authentication with the smart key is successful, based on a comparison between the authentication response time period and a pre-stored average response time period.

When the authentication response time period is less than or equal to the average response time period, the controller may update the average response time period based on the authentication response time period.

When the authentication response time period is less than or equal to the average response time period, the controller may compare the authentication response time period to a pre-stored minimum response time period, and when the authentication response time period is less than the minimum response time period, the controller may update the minimum response time period based on the authentication response time period.

When the authentication response time period is greater than the average response time period, the controller may determine whether authentication with the smart key is successful based on a comparison between the authentication response time period and a pre-stored maximum response time period.

The authentication request signal may include information about an RF communication channel, and when the authentication response time period is greater than the maximum response time period, the controller may determine whether authentication with the smart key is successful based on whether the authentication response signal has been transmitted through an RF communication channel corresponding to the information about the RF communication channel.

When the authentication response signal has been transmitted through the RF communication channel, the controller may update the maximum response time period based on the authentication response signal.

The LF communication unit may transmit the authentication request signal with predetermined LF output intensity, and when the authentication response time period is less than or equal to the maximum response time period, the controller may determine whether authentication with the smart key is successful based on the LF output intensity and information about LF reception intensity included in the authentication response signal.

When a difference between the LF output intensity and LF reception intensity corresponding to the information about the LF reception intensity is less than or equal to a reference value, the controller may update the maximum response time period based on the authentication response time period.

The authentication request signal may include a radio signal having a frequency band of 20 kHz to 150 kHz.

The authentication response signal may include a radio signal having a frequency band of 315 MHz to 433 MHz.

The LF communication unit may transmit a scanning signal and the RF communication unit may receive a scanning response signal. When the RF communication unit receives the scanning response signal, the LF communication unit may transmit the authentication request signal.

The authentication request signal may include information about an RF communication channel, the LF communication unit may transmit the authentication request signal with a predetermined LF output intensity, and the controller may determine whether authentication with the smart key is successful, based on whether the authentication response signal has been transmitted through an RF communication channel corresponding to the information about the RF communication channel, and the LF output intensity and information about LF reception intensity included in the authentication response signal.

Furthermore, in accordance with embodiments of the present disclosure, a method of controlling a vehicle includes: transmitting an authentication request signal to a smart key through a Low Frequency (LF) communication network; receiving an authentication response signal from the smart key through a Radio Frequency (RF) communication network; measuring an authentication response time period based on a time at which the authentication request signal is transmitted and a time at which the authentication response signal is received; and determining whether authentication with the smart key is successful, based on the authentication response time period.

The determining of whether authentication with the smart key is successful may include determining whether authentication with the smart key is successful based on a comparison between the authentication response time period and a pre-stored average response time period.

The determining of whether authentication with the smart key is successful may include: updating the average response time period based on the authentication response time period when the authentication response time period is less than or equal to the average response time period; and determining whether authentication with the smart key is successful based on a comparison between the authentication response time period and a maximum response time period when the authentication response time period is greater than the average response time period.

The authentication request signal may include information about an RF communication channel, and the determining of whether authentication with the smart key is successful may include determining whether authentication with the smart key is successful, based on whether the authentication response signal has been transmitted through an RF communication channel corresponding to the information about the RF communication channel when the authentication response time period is greater than the maximum response time period.

The transmitting of the authentication request signal to the smart key may include transmitting the authentication request signal with predetermined LF output intensity, and the determining of whether authentication with the smart key is successful may include determining whether authentication with the smart key is successful based on the LF output intensity and information about LF reception intensity included in the authentication response signal when the authentication response time period is less than or equal to the maximum response time period.

The method may further include updating the maximum response time period based on the authentication response time period when a difference between the LF output intensity and the LF reception intensity corresponding to the information about the LF reception intensity is less than or equal to a reference value.

The authentication request signal may include information about an RF communication channel, the transmitting of the authentication request signal to the smart key may include transmitting the authentication request signal with predetermined LF output intensity, and the determining of whether authentication with the smart key is successful may include determining whether authentication with the smart key is successful, based on whether the authentication response signal has been transmitted through an RF communication channel corresponding to the information about the RF communication channel, and the LF output intensity and information about LF reception intensity included in the authentication response signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF THE EMBODIMENTS

Purposes, advantages, and features of the present disclosure will be apparent by referring to embodiments described below in connection with the accompanying drawings. In this specification, like numbers refer to like elements throughout the description of the figures. In the following description, if it is determined that detailed descriptions for related art make the subject matter of the present disclosure obscure unnecessarily, the detailed descriptions will be omitted.

The terminology used herein is for the purpose of describing particular embodiments only and is not intended to be limiting of the disclosure. In this specification, the terms "first" and "second", as applied to detectable species, are used for the purposes of identification and do not imply any order of detection.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
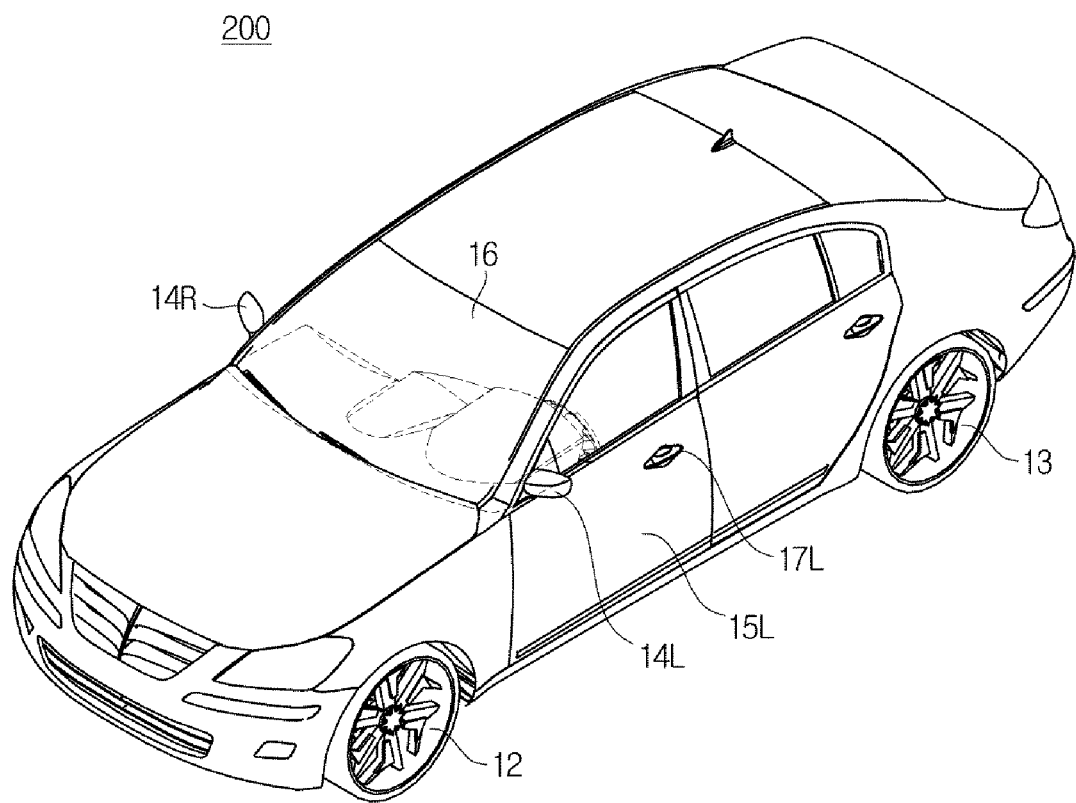
FIG. 1 shows an outer appearance of a vehicle according embodiments of the present disclosure.
Figure 2:
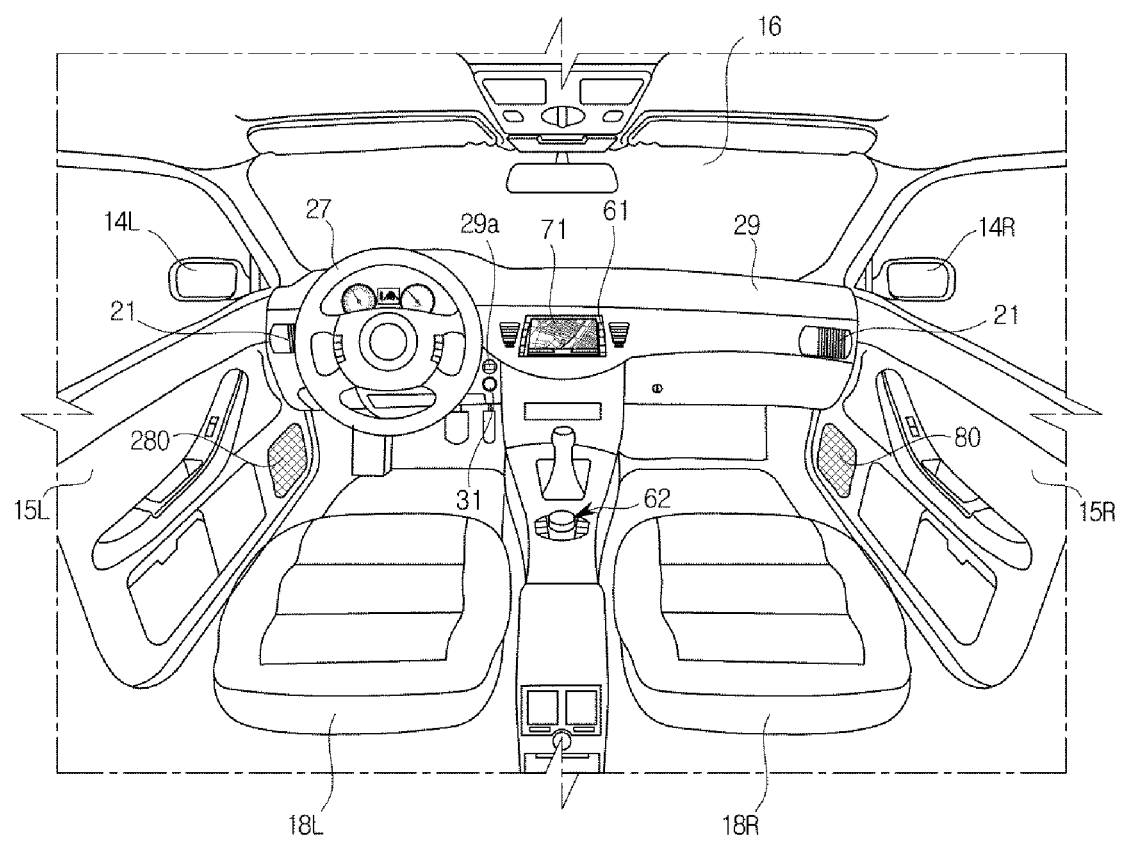
FIG. 2 shows an interior of a vehicle according to embodiments of the present disclosure.

Referring now to the disclosed embodiments, FIG. 1 shows an outer appearance of a vehicle according to embodiments of the present disclosure, and FIG. 2 shows an interior of a vehicle according to embodiments of the present disclosure. Referring to FIG. 1, an outer appearance of a vehicle 200 according to embodiments of the present disclosure may include a plurality of wheels 12 and 13 to move the vehicle 200, a plurality of doors 15L to shield the interior of the vehicle 200 from the outside, a front glass 16 to provide a driver inside the vehicle 200 with a front view of the vehicle 200, and a plurality of side-view mirrors 14L and 14R to provide the driver with a rear view of the vehicle 200, as is generally known in the art.

The wheels 12 and 13 may include front wheels 12 provided in the front part of the vehicle 200, and rear wheels 13 provided in the rear part of the vehicle 200. The vehicle 200 may include a driving apparatus (not shown). The driving apparatus may provide rotatory power to the front wheels 12 or the rear wheels 13 so that the vehicle 200 moves forward or backward. The driving apparatus may adopt an engine to burn fossil fuel to produce rotatory power, or a motor to receive power from a condenser (not shown) to produce rotatory power.

The doors 15L and 15R (see FIG. 2) may be rotatably provided to the left and right of the vehicle 200 to allow the driver or passenger to open one of them and get into the vehicle 200. Also, the doors 71 and 72 may shield the interior of the vehicle 200 from the outside when all of them close. Also, in the outer appearance of the vehicle 200, handles 17L for enabling a user to open or close the doors 15L and 15R may be provided, and in the handles 17L, Low Frequency (LF) antennas (not shown) for transmitting LF signals may be installed. If authentication between the vehicle 200 and a smart key 100 (see FIG. 3) is completed through a wireless communication network, a door lock of the vehicle 200 may be released so that a user can pull one of the handles 17L to open the corresponding door 15L.

The front glass 16 may be provided in the upper, front part of the vehicle 200 to allow the driver inside the vehicle 200 to acquire a front view of the vehicle 200. The front glass 16 is also called a windshield glass. The side-view mirrors 14L and 14R may include a left side-view mirror 14L provided to the left of the vehicle 200 and a right side-view mirror 14R provided to the right of the vehicle 200 to allow the driver inside the vehicle 200 to acquire side and rear views of the vehicle 200.

In addition, the vehicle 200 may include a proximity sensor to sense an obstacle or another vehicle behind or beside the vehicle 10, and a rain sensor to determine if it rains and to sense an amount of rainfall. The proximity sensor may send a sensing signal backward or sideways from the vehicle 200, and receive a reflection signal reflected from an obstacle such as another vehicle. The proximity sensor may sense if an obstacle exists beside or behind the vehicle 200, and detect the location of the obstacle, based on the waveform of the received reflection signal. The proximity sensor may use, for example, a method of sending ultrasonic waves or infrared rays and measuring a distance to an obstacle based on ultrasonic waves or infrared rays reflected from the obstacle.

Referring now to FIG. 2, in the center part of a dash board 29, an Audio Video Navigation (AVN) display 71 and an AVN input unit 61 may be positioned. The AVN display 71 may display at least one of an audio screen, a video screen, and a navigation screen, selectively, and also display various control screens related to the control of the vehicle 200 or screens related to additional functions. The AVN display 71 may be implemented with Liquid Crystal Display (LCD), Light Emitting Diode (LED), Plasma Display Panel (PDP), Organic Light Emitting Diode (OLED), or Cathode Ray Tube (CRT).

The AVN input unit 61 may be located close to the AVN display 71, and implemented as a hard key type. If the AVN display 71 is implemented as a touch screen, the AVN input unit 61 may be provided in the form of a touch panel on the front surface of the AVN display 71. Also, a center input unit 62 of a jog shuttle type may be provided between a driver seat 18L and a passenger seat 18R. A user may turn or press the center input unit 62 or push the center input unit in a up, down, left, or right direction to thus input a control command.

The vehicle 200 may include a sound output unit 80 for outputting sound, and the sound output unit 80 may be a speaker. The sound output unit 80 may output sound required for performing an audio function, a navigation function, and other additional functions. For example, two sound output units 80 may be installed in the left door 15L and the right door 15R, respectively, and another sound output unit 80 may be installed in another location, such as doors around the back seat and the dashboard 29, as necessary.

In the dashboard 29 near the driver seat 18L, a steering wheel 27 may be provided, and a key hole 29a into which the smart key (e.g., a FOB key) 100 can be inserted may be formed at an area adjacent to the steering wheel 27. If the smart key 100 is inserted into the key hole 29a, or if authentication between the smart key 100 and the vehicle 100 is completed through a wireless communication network, the smart key 100 may be connected to the vehicle 200. Also, a start button 31 for turning on/off the ignition of the vehicle 200 may be installed on the dashboard 29. When the smart key 100 is inserted into the key hole 29a, or when authentication between the smart key 100 and the vehicle 200 is successful through the wireless communication network, a user may press the start button 31 to turn on the ignition of the vehicle 200. Meanwhile, the vehicle 200 may include an air conditioner that can perform both heating and cooling to discharge heated or cooled air through air vents 21 to thus control an internal temperature of the vehicle 200.

Figure 3:
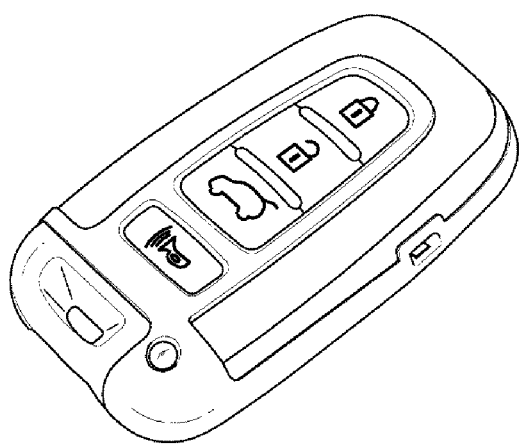
FIG. 3 shows an example of a smart key according to embodiments of the present disclosure.
Figure 4:
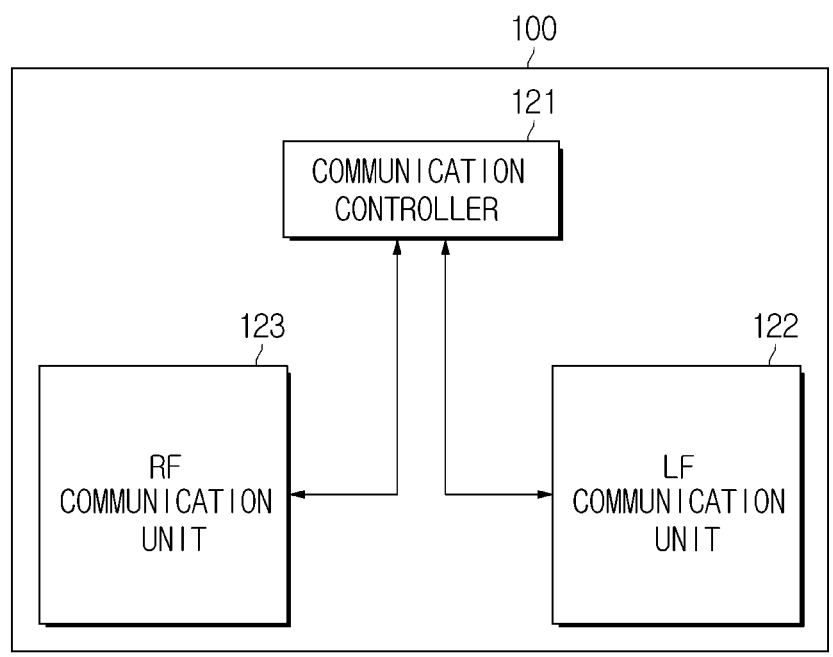
FIG. 4 is a control block diagram of a smart key according to embodiments of the present disclosure.

FIG. 3 shows an example of the smart key 100 according to embodiments of the present disclosure, and FIG. 4 is a control block diagram of the smart key 100 according to embodiments of the present disclosure. The smart key 100 may transmit/receive radio signals to/from the vehicle 200 to thus connect to the vehicle 200. As shown in FIG. 3, the smart key 100 may be a FOB key that connects to the vehicle 200 in a wired or wireless fashion to release a door lock or to start the vehicle 200.

However, the smart key 100 is not limited to a FOB key, and may be any input device that can control the vehicle 200 to release a door lock or to start and travel. For example, if a mobile device functions as a smart key, the smart key 100 may be such a mobile device. In this case, an application for enabling the mobile device to function as the smart key 100 may be installed in the mobile device. The mobile terminal may store the application installed when released, or the mobile terminal may download the application from an external server. In order for the mobile device to function as the smart key 100 for the vehicle 200, an authentication procedure may be performed. The smart key 100 may be sold in connection with the vehicle 200, and may store authentication information for connecting to the vehicle 200.

Referring to FIG. 4, the smart key 100 according to an embodiment of the present disclosure may include a communication controller 121 to control communication with the vehicle 200, a Low Frequency (LF) communication unit 122 to receive LF signals, and a Radio Frequency (RF) communication unit 123 to transmit RF signals. The communication controller 121 may include a memory to store programs and data for modulating/demodulating LF signals or RF signals, and a processor to modulate/demodulate LF signals or RF signals according to the programs and data stored in the memory.

The LF communication unit 122 may receive a LF signal transmitted from various kinds of electronic devices outside the smart key 100 through a LF communication network. For example, the LF signal may be a radio signal having a low frequency band of 20 kHz to 150 kHZ. The LF communication unit 122 according to an embodiment may receive a scanning signal that the vehicle 200 transmits at regular time intervals, and an authentication request signal that the vehicle 200 transmits in order to perform an authentication process. The LF signal may include the scanning signal and the authentication request signal. Meanwhile, the process of receiving the scanning signal may be omitted.

The scanning signal may be a LF signal transmitted from the vehicle 200 to a predetermined distance (i.e., a distance allowing LF communication) for the vehicle 200 to determine whether there is the smart key 100 in a range allowing LF communication with the vehicle 200. The LF communication unit 122 may include a LF communication interface that includes a communication port to connect the communication controller 121 to the LF communication network and a receiver to receive a LF signal. Also, the LF communication unit 122 may further include a LF signal conversion module to demodulate a LF signal received through the LF communication interface into a control signal, under the control of the communication controller 121.

The RF communication unit 123 may transmit an RF signal to various kinds of electronic devices outside the smart key 100 through an RF communication network. For example, the RF signal may be a radio signal having a Ultra-High Frequency (UHF) band of 315 MHz to 433 MHz.

The RF communication unit 123 according to embodiments may transmit a scanning response signal responding to a scanning signal from the vehicle 200, and an authentication response signal including authentication information stored in the memory to the vehicle 200. The RF signal may include the scanning response signal and the authentication response signal. Meanwhile, if the process of receiving the scanning signal is omitted, the process of transmitting the scanning response signal may also be omitted.

The scanning response signal may be an RF signal transmitted from the smart key 100 to the vehicle 200 in order to inform the vehicle 200 that the smart key 100 has received a scanning signal from the vehicle 200. The RF communication unit 123 may include an RF communication interface that includes a communication port to connect the communication controller 121 to the RF communication network, and a transmitter to transmit an RF signal. Also, the RF communication unit 123 may modulate a digital control signal output from the communication controller 121 into an analog communication signal to transmit the analog communication signal through the RF communication interface.

As described above, the LF signal may be a signal that is received by the smart key 100 through the LF communication network, and the RF signal may be a signal that the smart key 100 transmits through the RF communication network. A control signal of the smart key 100 may be a signal that is transmitted/received in the smart key 100. The control signal, the RF signal, and the LF signal may have different formats.

Figure 5:
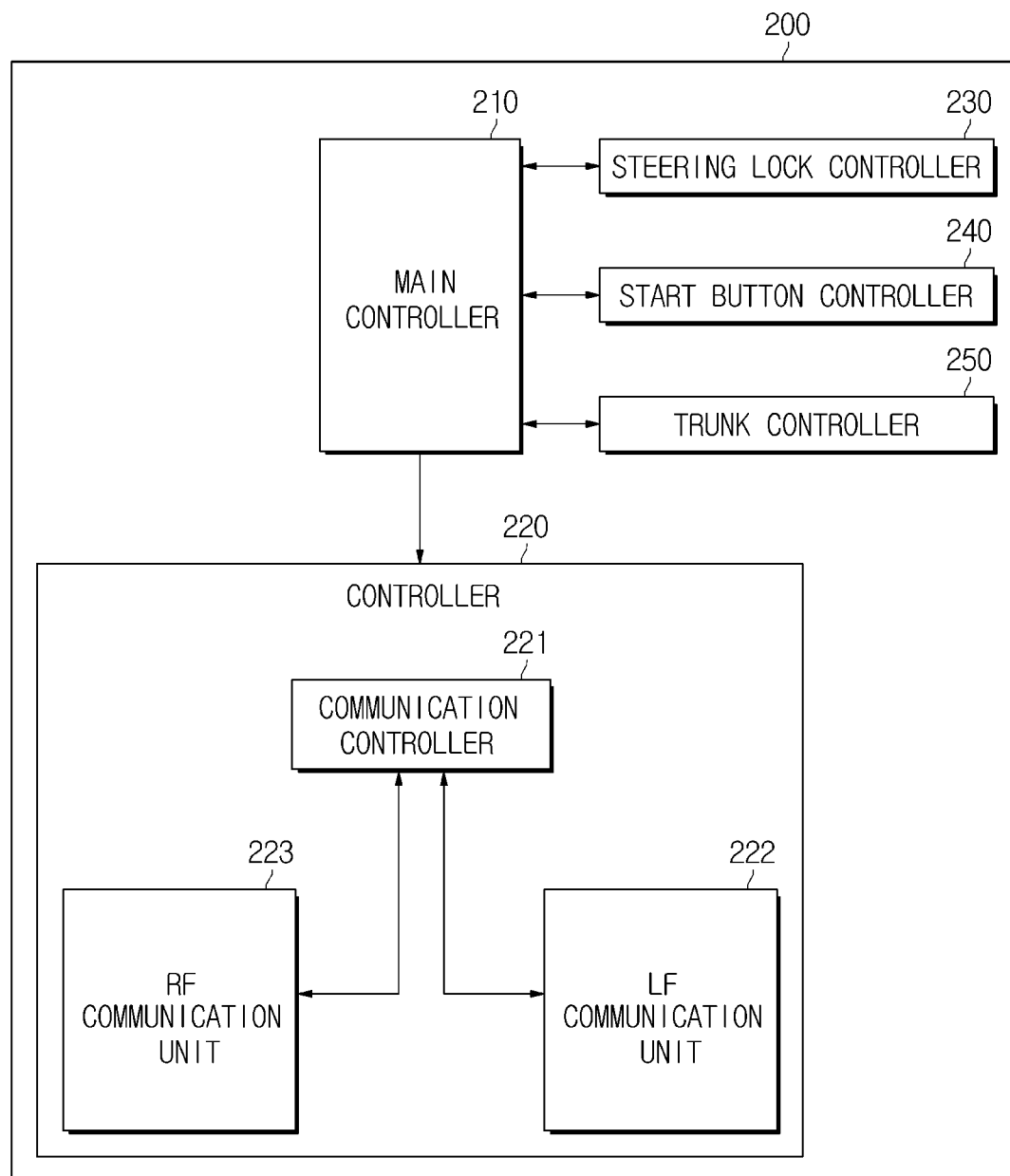
FIG. 5 is a control block diagram of a vehicle according to embodiments of the present disclosure.

FIG. 5 is a control block diagram of a vehicle according to embodiments of the present disclosure. Referring to FIG. 5, the vehicle 200 may include a main controller 210 to control various kinds of application components in the vehicle 200, and a communication unit 220 to communicate with external devices outside the vehicle 200.

Also, the vehicle 200 may further include a steering lock controller 230 to control a locked/unlocked state of the steering wheel 207, a start button controller 240 to control a locked/unlocked state of the start button 31 for turning on/off the ignition of the vehicle 200, and a trunk controller 250 to control a locked/unlocked state of a trunk (not shown) of the vehicle 200. In addition, the vehicle 200 may further include various control modules for controlling locked/unlocked states of application components in the vehicle 200 according to authentication success/failure with the smart key 100. However, the steering lock controller 230, the start button controller 240, and the trunk controller 250 may not be essential components. That is, according to embodiments of the present disclosure, the entire or a part of the steering lock controller 230, the start button controller 240, and the trunk controller 250 may be omitted, or may be combined with the main controller 210 to be implemented with a single memory and a single processor.

The main controller 210 may control various kinds of application components included in the vehicle 200. For example, the main controller 210 may control the communication unit 220 to transmit an authentication request signal to another communication agent. The main controller 210 may include a memory to store programs and data for controlling application components in the vehicle 200, and a processor to generate a control signal according to the programs and data stored in the memory.

The communication unit 220 may include a component required for the vehicle 200 to communicate with an external device. The communication unit 220 according to an embodiment may include a communication controller 221 to control communication with the smart key 100, a LF communication unit 222 to transmit LF signals, and an RF communication unit 223 to receive RF signals. The communication controller 221 may include a memory to store programs and data for modulating/demodulating LF signals or RF signals, and a processor to modulate/demodulate LF signals or RF signals according to the programs and data stored in the memory.

According to embodiments of the present disclosure, the communication controller 221 and the main controller 210 may be implemented with separate memories and separate processors, or with a single memory and a single processor. The LF communication unit 222 may transmit a LF signal to various kinds of electronic devices outside the vehicle 200 through the LF communication network. For example, the LF signal may be a radio signal having a low frequency band of 20 kHz to 150 kHz. The LF communication unit 222 according to an embodiment may transmit a scanning signal and an authentication request signal to the smart key 100. The LF signal may include the scanning signal and the authentication request signal. Meanwhile, the process of transmitting the scanning signal may be omitted.

The scanning signal may be a LF signal transmitted from the LF communication unit 222 to a predetermined distance (i.e., a distance allowing LF communication) for the vehicle 200 to determine whether there is the smart key 100 in a range allowing LF communication with the vehicle 200. The LF communication unit 222 may include a LF communication interface that includes a communication port to connect the communication controller 221 to the LF communication network and a receiver to receive a LF signal. Also, the LF communication unit 222 may modulate a digital control signal output from the communication controller 221 into an analog communication signal to transmit the analog communication signal through the LF communication interface.

The RF communication unit 223 may receive an RF signal transmitted from various kinds of electronic devices outside the vehicle 200 through the RF communication network. For example, the RF signal may be a radio signal having a UHF band of 315 MHz to 433 MHz. The RF communication unit 223 according to an embodiment may receive a scanning response signal and an authentication response signal. The RF signal may include the scanning response signal and the authentication response signal. Meanwhile, if the process of transmitting the scanning signal is omitted, the process of receiving the scanning response signal may also be omitted.

The scanning response signal may be an RF signal transmitted to the vehicle 200 from the smart key 100 in order to inform the vehicle 200 that the smart key 100 has received a scanning signal from the vehicle 200. The RF communication unit 223 may include an RF communication interface that includes a communication port to connect the communication controller 221 to the RF communication network and a receiver to receive an RF signal. Also, the RF communication unit 223 may further include an RF signal conversion module to demodulate an RF signal received through the RF communication interface into a control signal, under the control of the communication controller 221.

As described above, the LF signal may be a signal that the vehicle 200 transmits through the LF communication network, and the RF signal may be a signal that is received by the vehicle 200 through the RF communication network. A control signal of the vehicle 200 may be a signal that is transmitted/received in the vehicle 200. The control signal, the RF signal, and the LF signal may have different formats.

Hereinafter, an authentication process between the smart key 100 and the vehicle 200 will be described with reference to FIGS. 6 to 9.

Figure 6:
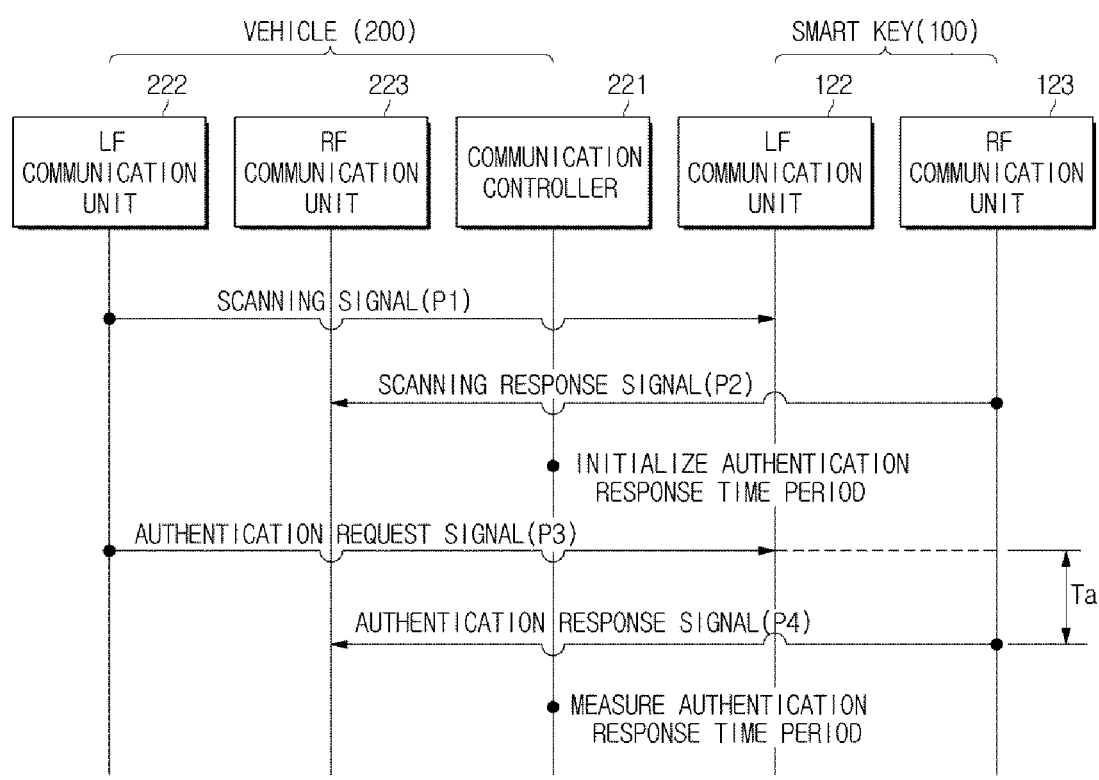
FIG. 6 is a block diagram for describing a process for transmitting and receiving radio signals between a vehicle and a smart key.
Figure 7:
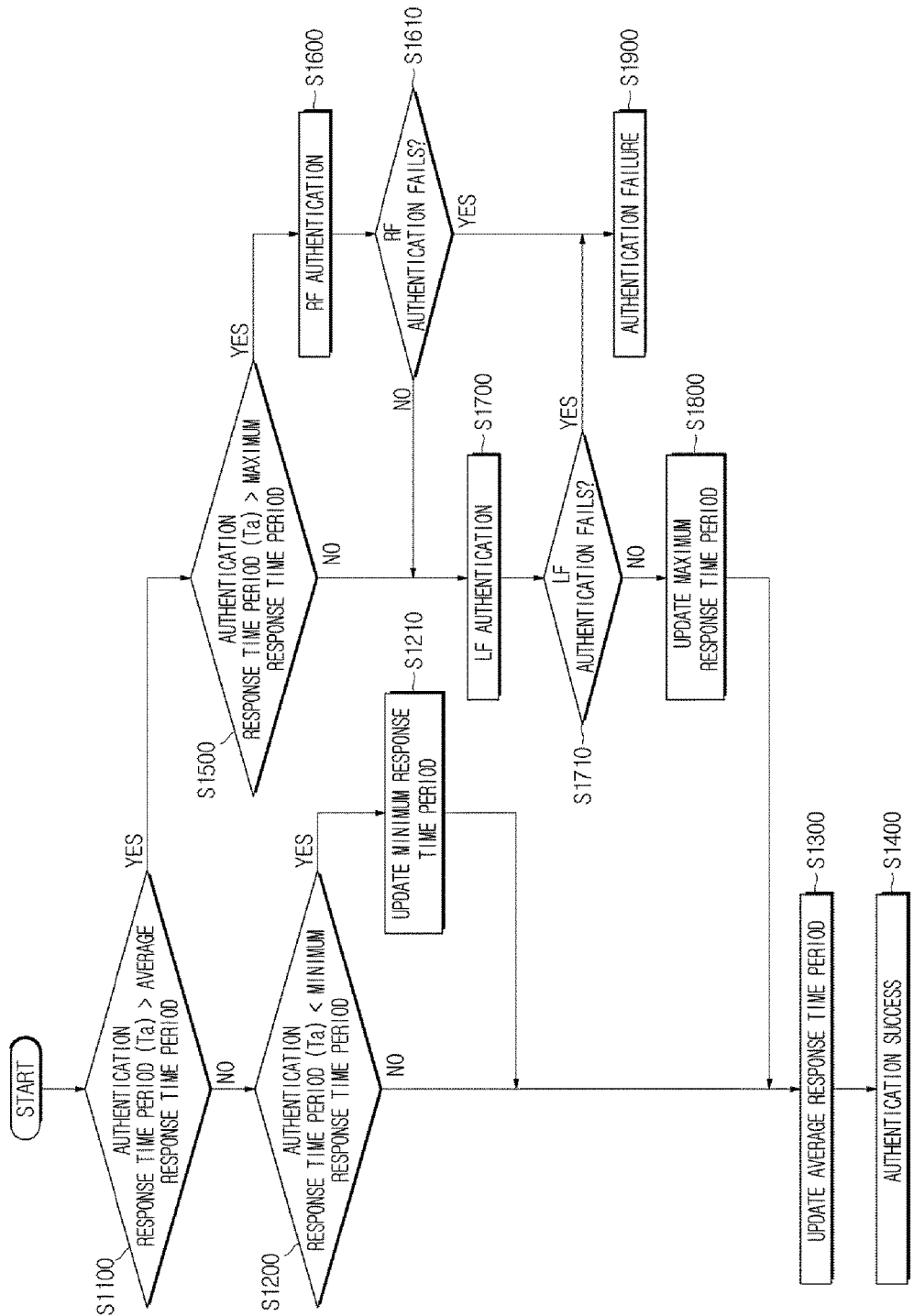
FIG. 7 is a flowchart illustrating a process in which a vehicle according to embodiments of the present disclosure performs authentication with a smart key.

FIG. 6 is a block diagram for describing a process for transmitting and receiving radio signals between the vehicle 200 and the smart key 100, and FIG. 7 is a flowchart illustrating a process in which the vehicle 200 according to embodiments of the present disclosure performs authentication with the smart key 100. The LF communication network, which is a communication network of a low frequency band, may transmit/receive radio signals over a less distance than the RF communication network having the UHF band. Accordingly, in order for the vehicle 200 and the smart key 100 to transmit/receive radio signals through the LF communication network, the vehicle 200 and the smart key 100 may need to be located within a predetermined distance allowing LF communication.

Referring to FIG. 6, the LF communication unit 222 of the vehicle 200 may transmit a scanning signal P1 around the vehicle 200 (i.e., within a distance to which LF signals can be transmitted). At this time, the LF communication unit 222 of the vehicle 200 may transmit the scanning signal P1 at regular time intervals around the vehicle 200. More specifically, if the smart key 100 exists within a distance allowing LF communication, the LF communication unit 222 according to an embodiment may transmit a scanning signal P1 to the LF communication unit 122 of the smart key 100. However, if the smart key 100 is located outside the distance allowing LF communication, the scanning signal P1 may fail to reach the LF communication unit 122 of the smart key 100.

If the LF communication unit 122 of the smart key 100 according to embodiments receives the scanning signal P1, the RF communication unit 123 of the smart key 100 may transmit a scanning response signal as a reception acknowledge signal to the vehicle 200. Since the RF communication network having the UHF band can transmit/receive radio signals over a wider distance than the LF communication network having the low frequency band, the RF communication unit 123 of the smart key 100 may transmit the scanning response signal P2 to the vehicle 200 at a distance that is farther than the distance allowing LF communication.

If the RF communication unit 223 of the vehicle 200 according to an embodiment receives the scanning response signal P2, the LF communication unit 222 may transmit an authentication request signal P3 around the vehicle 200 (i.e., within a distance to which LF signals can be transmitted). If the RF communication unit 123 of the smart key 100 according to an embodiment receives the authentication request signal P3, the RF communication unit 123 may transmit an authentication response signal P4 including authentication information to the vehicle 200 through the RF communication network.

In this case, the communication controller 221 may measure a time at which the authentication request signal P3 is transmitted and a time at which the authentication response signal P4 is received, and measure an authentication response time period Ta based on the time at which the authentication request signal P3 is transmitted and the time at which the authentication response signal P4 is received. For example, as shown in FIG. 6, when the scanning response signal P2 is received, the communication controller 221 of the vehicle 200 may initialize a pre-stored authentication response time period, and when the authentication response signal P4 is received, the communication controller 121 of the vehicle 200 may measure an authentication response time period Ta elapsed by the time the authentication response signal P4 is received. In order to measure the authentication response time period Ta, the vehicle 200 may further include a timer for measuring a time. Also, the communication controller 121 of the vehicle 200 may determine whether authentication with the smart key 100 is successful, based on the authentication information received from the smart key 100 and the authentication response time period Ta.

Hereinafter, a process in which the vehicle 200 determines whether authentication is successful based on the authentication response time period Ta will be described with reference to FIG. 7. FIG. 7 is a flowchart illustrating a process in which the vehicle 200 according to embodiments performs authentication with the smart key 100. The communication controller 221 of the vehicle 200 may record and store a tack table in a memory. The tack table may include information about: i) a minimum response time period, ii) a maximum response time period, and iii) an average response time period.

As shown in FIG. 7, first, the communication controller 221 may compare the measured authentication response time period Ta to the pre-stored average response time period, in operation S1100. If the communication controller 221 determines that the authentication response time period Ta is less than or equal to the average response time period ("No" in operation S1100), the communication controller 221 may compare the authentication response time period Ta to the pre-stored minimum response time period, in operation S1200. If the communication controller 221 determines that the authentication response time period Ta is greater than or equal to the minimum response time period ("No" in operation S1200), the communication controller 221 may update the average response time period stored in the tack table, based on the pre-stored average response time period and the authentication response time period Ta, in operation S1300, and determine that authentication is successful, in operation S1400.

However, if the communication controller 221 determines that the authentication response time period Ta is less than the minimum response time period ("Yes" in operation S1200), the communication controller 221 may update the minimum response time period stored in the tack table, based on the authentication response time period Ta and the pre-stored minimum response time period, in operation S1210. In this case, the communication controller 221 may update the minimum response time period stored in the tack table to the authentication response time period Ta. Then, the communication controller 221 may update the average response time period stored in the tack table, based on the pre-stored average response time period and the authentication response time period Ta, in operation S1300, and determine that authentication is successful, in operation S1400.

Meanwhile, if the communication controller 221 determines that the authentication response time period Ta is greater than the average response time period ("Yes" in operation S1100), the communication controller 221 may compare the authentication response time period Ta to the maximum response time period, in operation S1500. In this case, the communication controller 221 may determine that a hacking attempt from the outside occurred. If the communication controller 221 determines that the authentication response time period Ta is less than or equal to the maximum response time period ("No" in operation S1500), the communication controller 221 may perform LF authentication, in operation S1700. The LF authentication may be a procedure of performing authentication with the smart key 100 using a LF communication method. The LF authentication will be described with reference to FIG. 9, later.

If the communication controller 221 determines that LF authentication is successful, the communication controller 221 may update the maximum response time period stored in the tack table, based on the authentication response time period Ta and the pre-stored maximum response time period, in operation S1800. In this case, the communication controller 221 may update the maximum response time period stored in the tack table to the authentication response time period Ta. Then, the communication controller 221 may update the average response time period stored in the tack table, based on the authentication response time period Ta and the pre-stored average response time period, in operation S1300, and determine that authentication is successful, in operation S1400.

Meanwhile, if the communication controller 221 determines that the authentication response time period Ta is greater than the maximum response time period ("Yes" in operation S1500), the communication controller 221 may perform RF authentication, in operation S1600. The RF authentication may be a procedure of performing authentication with the smart key 100 using an RF communication method. The RF authentication will be described with reference to FIG. 8, later.

If the communication controller 221 determines that the RF authentication fails ("Yes" in operation S1610), the communication controller 221 may determine that authentication with the smart key 100 fails, in operation S1900. If the communication controller 221 determines that the RF authentication is successful ("No" in operation S1610), the communication controller 221 may perform LF authentication, in operation S1700.

Successively, if the communication controller 221 determines that the LF authentication fails ("Yes" in operation S1710), the communication controller 221 may determine that authentication with the smart key 100 fails, in operation S1900. If the communication controller 221 determines that the LF authentication is successful ("No" in operation S1710), the communication controller 221 may update the maximum response time stored in the tack table, based on the authentication response time period Ta and the pre-stored maximum response time period, in operation S1800.

Then, the communication controller 221 may update the average response time period stored in the tack table, based on the authentication response time period Ta and the pre-stored average response time period, in operation S1300, and determine that authentication is successful, in operation S1400. That is, the communication controller 221 may additionally perform LF authentication and RF authentication to thereby accurately determine whether hacking into radio signals occurs.

Figure 8:
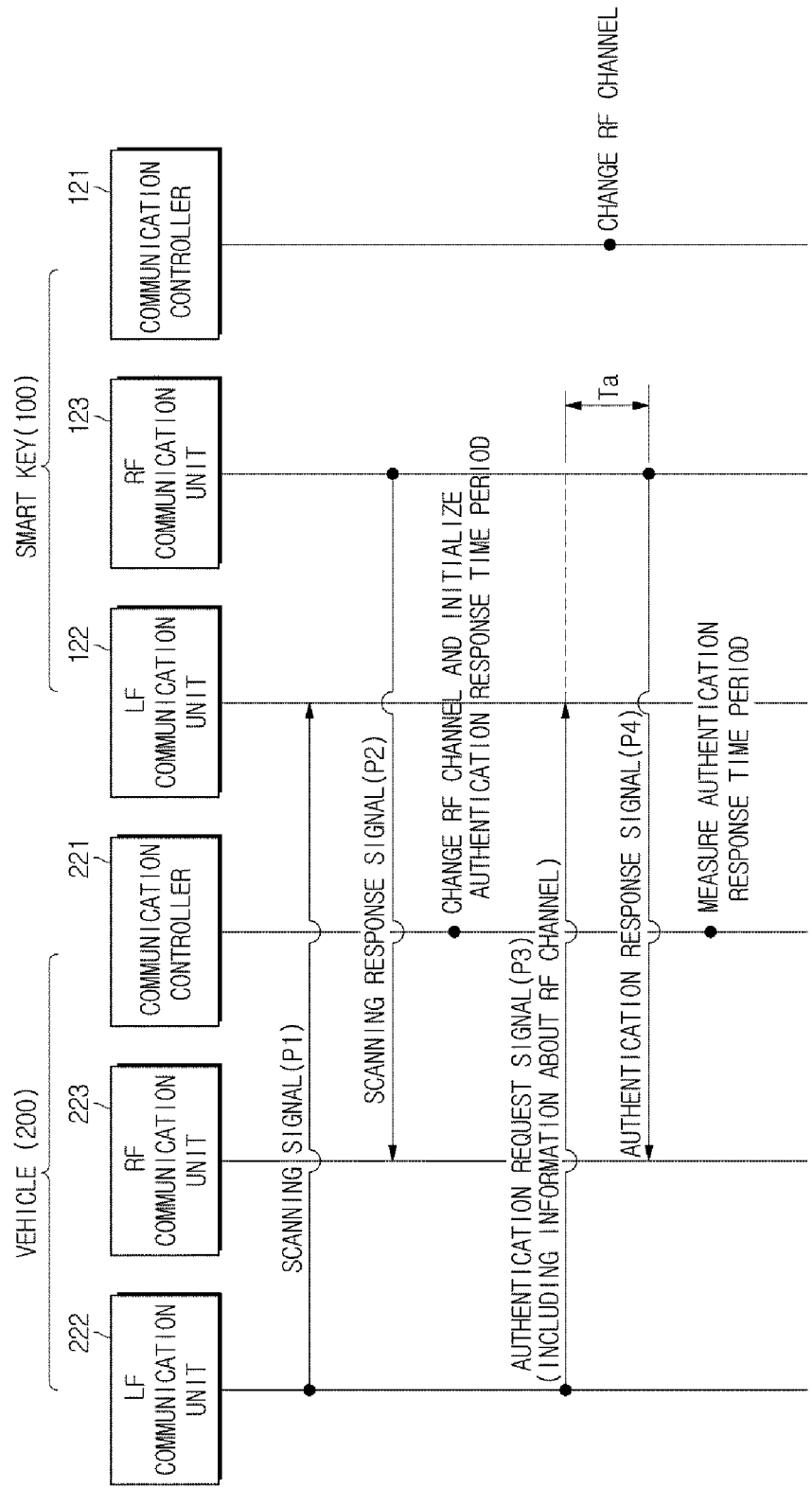
FIG. 8 is a flowchart illustrating a process for Radio Frequency (RF) authentication between a vehicle and a smart key, according to embodiments of the present disclosure.
Figure 9:
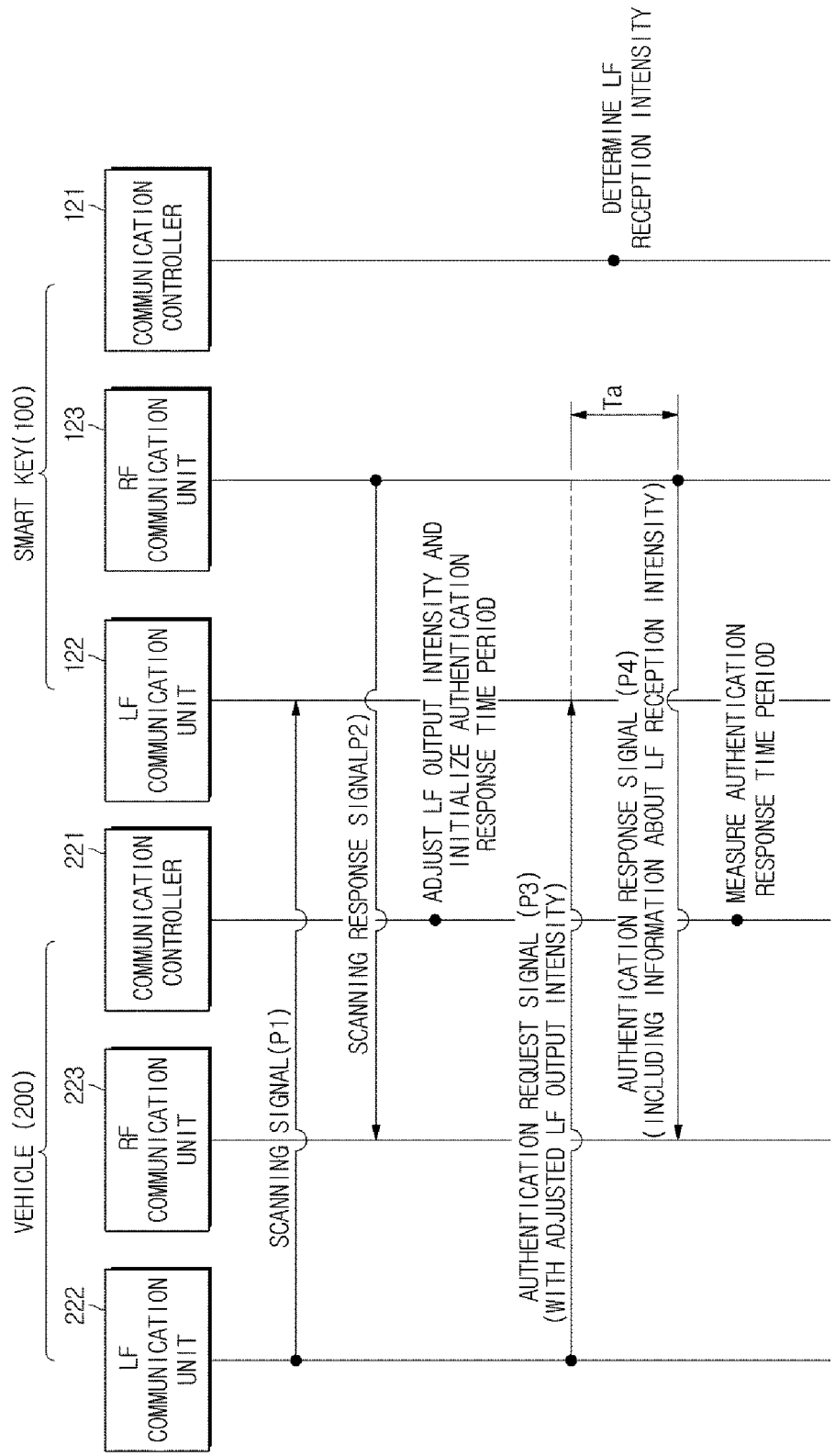
FIG. 9 is a flowchart illustrating a process for Low Frequency (LF) authentication between a vehicle and a smart key, according to embodiments of the present disclosure.

Hereinafter, a process for RF authentication and a process for LF authentication will be described with reference to FIGS. 8 and 9. FIG. 8 is a flowchart illustrating a process for RF authentication between the vehicle 200 and the smart key 100, according to embodiments of the present disclosure and a smart key, and FIG. 9 is a flowchart illustrating a process for LF authentication between the vehicle 200 and the smart key 100, according to embodiments of the present disclosure.

Referring to FIG. 8, if a scanning response signal P2 is received from the smart key 100, the communication controller 221 of the vehicle 200 may change an RF communication channel (hereinafter, simply referred to as an RF channel) of the RF communication unit 223 of the vehicle 200 for RF authentication with the smart key 100, and initialize an authentication response time period, that is, measure a time at which an authentication request signal P3 is transmitted.

Successively, the LF communication unit 222 of the vehicle 200 may transmit an authentication request signal P3 to the LF communication unit 122 of the smart key 100. At this time, the LF communication unit 122 may transmit an authentication request signal P3 including RF channel information as authentication information. If the LF communication unit 122 of the smart key 100 receives the authentication request signal P3, the communication controller 121 of the smart key 100 may change an RF channel of the RF communication unit 123, based on the RF channel information included in the authentication request signal P3. If the RF channel of the RF communication unit 123 changes, the RF communication unit 123 may transmit an authentication response signal P4 to the RF communication unit 223 through the changed RF channel.

Successively, if the RF communication unit 223 of the vehicle 200 receive the authentication response signal P4 from the RF communication unit 123 of the smart key 100, the communication controller 221 may measure an authentication response time period Ta, that is, measure a time at which the authentication response signal P4 is received, and then compare the authentication response time period Ta to the minimum response time period, the maximum response time period, or the average response time period, as described above with reference to FIG. 7.

As described above with reference to FIG. 7, if the communication controller 221 determines that the authentication response time period Ta is greater than the maximum response time period ("Yes" in operation S1500), the communication controller 221 may determine whether the authentication response signal P4 has been received through the changed RF channel. If the communication controller 221 determines that the authentication response signal P4 has been received through the changed RF channel, the communication controller 221 may determine that RF authentication is successful ("No" in operation S1610).

However, if the communication controller 221 determines that the authentication response signal P4 has been received through a channel that is different from the changed RF channel, the communication controller 221 may determine that RF authentication fails ("Yes" in operation S1610).

Also, referring to FIG. 9, if a scanning response signal P2 is received from the smart key 100, the communication controller 221 of the vehicle 200 according to another embodiment may change output intensity of a LF signal (i.e., an authentication request signal P3) of the LF communication unit 222 of the vehicle 200 for LF authentication with the smart key 100, and initialize an authentication response time period, that is, measure a time at which the authentication request signal P3 is transmitted.

Successively, the LF communication unit 222 of the vehicle 200 may transmit the authentication request signal P3 to the LF communication unit 122 of the smart key 100. If the LF communication unit 122 of the smart key 100 receives the authentication request signal P3, the communication controller 221 of the smart key 100 may determine reception intensity of the authentication request signal P3 received by the LF communication unit 122. Then, the RF communication unit 123 of the smart key 100 may transmit an authentication response signal P4 including information about the determined reception intensity (hereinafter, simply referred to as LF reception intensity) of the authentication request signal P3, to the RF communication unit 223 of the vehicle 200.

Successively, if the RF communication unit 223 of the vehicle 200 receives the authentication response signal P4 from the RF communication unit 123 of the smart key 100, the communication controller 221 may measure an authentication response time period Ta, that is, measure a time at which the authentication response time period P4 is received, and then compare the authentication response time period Ta to the minimum response time period, the maximum response time period, or the average response time period, as described above with reference to FIG. 7.

As described above with reference to FIG. 7, if the communication controller 221 of the vehicle 200 determines that the authentication response time period Ta is greater than the average response time period ("Yes" in operation S1100) and less than or equal to the maximum authentication response time period ("No" in operation S1500), the communication controller 221 of the vehicle 200 may determine whether a difference between the output intensity of the LF signal output from the communication controller 221 and the reception intensity of the LF signal received by the smart key 100 is smaller than or equal to a predetermined reference value (i.e., whether the output intensity is similar to the reception intensity), based on the information about the LF reception intensity received from the smart key 100. If the communication controller 221 of the vehicle 200 determines that the difference between the output intensity and the reception intensity is smaller than or equal to the predetermined reference value, the communication controller 221 of the vehicle 200 determines that LF authentication is successful ("No" in operation S1710).

However, if the communication controller 221 of the vehicle 200 determines that the difference between the output intensity of the LF signal output from the communication controller 221 and the reception intensity of the LF signal received by the smart key 100 is greater than the predetermined reference value, the communication controller 221 may determine that LF authentication fails ("Yes" in operation S1710).

The aforementioned descriptions are only for illustrative purposes, and it will be apparent that those skilled in the art can make various modifications thereto without changing the technical spirit and essential features of the present disclosure. Thus, it should be understood that the embodiments described above are merely for illustrative purposes and not for limitation purposes in all aspects. For example, each component described as a single type can be implemented in a distributed type, and components described as distributed can be implemented in a combined form.

In the vehicle and the control method thereof according to the above-described embodiments, since the vehicle can determine whether hacking into radio signals occurs based on a communication delay time period, it is possible to perform secure wireless communication with an authenticated smart key. Also, in the above-described embodiments, it is possible to determine whether hacking into radio signals occurs using a typical LF communication method and a typical RF communication method without changing a wireless communication method.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a Low Frequency (LF) communication unit transmitting an authentication request signal to a smart key through an LF communication network;
a Radio Frequency (RF) communication unit receiving an authentication response signal from the smart key through an RF communication network; and
a controller measuring an authentication response time period between a time at which the authentication request signal is transmitted and a time at which the authentication response signal is received and determining whether authentication with the smart key is successful based on the authentication response time period.

2. The vehicle according to claim 1, wherein the controller determines whether authentication with the smart key is successful based on a comparison between the authentication response time period and a pre-stored average response time period.

3. The vehicle according to claim 2, wherein, when the controller determines that the authentication response time period is less than or equal to the average response time period, the controller updates the average response time period based on the authentication response time period.

4. The vehicle according to claim 3, wherein, when the authentication response time period is less than or equal to the average response time period, the controller compares the authentication response time period to a pre-stored minimum response time period, and when the authentication response time period is less than the minimum response time period, the controller updates the minimum response time period based on the authentication response time period.

5. The vehicle according to claim 2, wherein, when the authentication response time period is greater than the average response time period, the controller determines whether authentication with the smart key is successful based on a comparison between the authentication response time period and a pre-stored maximum response time period.

6. The vehicle according to claim 5, wherein the authentication request signal includes information about an RF communication channel, and when the authentication response time period is greater than the maximum response time period, the controller determines whether authentication with the smart key is successful based on whether the authentication response signal has been transmitted through an RF communication channel corresponding to the information about the RF communication channel.

7. The vehicle according to claim 6, wherein, when the authentication response signal has been transmitted through the RF communication channel, the controller updates the maximum response time period based on the authentication response time period.

8. The vehicle according to claim 5, wherein the LF communication unit transmits the authentication request signal with a predetermined LF output intensity, and when the authentication response time period is less than or equal to the maximum response time period, the controller determines whether authentication with the smart key is successful based on the LF output intensity and information about LF reception intensity included in the authentication response signal.

9. The vehicle according to claim 8, wherein, when a difference between the LF output intensity and the LF reception intensity corresponding to the information about the LF reception intensity is less than or equal to a reference value, the controller updates the maximum response time period based on the authentication response time period.

10. The vehicle according to claim 1, wherein the authentication request signal includes a radio signal having a frequency band of 20 kHz to 150 kHz.

11. The vehicle according to claim 1, wherein the authentication response signal includes a radio signal having a frequency band of 315 MHz to 433 MHz.

12. The vehicle according to claim 1, wherein the LF communication unit transmits a scanning signal, the RF communication unit receives a scanning response signal, and when the RF communication unit receives the scanning response signal, the LF communication unit transmits the authentication request signal.

13. The vehicle according to claim 1, wherein the authentication request signal includes information about an RF communication channel, the LF communication unit transmits the authentication request signal with a predetermined LF output intensity, and the controller determines whether authentication with the smart key is successful based on whether the authentication response signal has been transmitted through an RF communication channel corresponding to the information about the RF communication channel, and the LF output intensity and information about LF reception intensity included in the authentication response signal.

14. A method of controlling a vehicle, comprising:
transmitting an authentication request signal to a smart key through a Low Frequency (LF) communication network;
receiving an authentication response signal from the smart key through a Radio Frequency (RF) communication network;
measuring an authentication response time period between a time at which the authentication request signal is transmitted and a time at which the authentication response signal is received; and
determining whether authentication with the smart key is successful based on the authentication response time period.

15. The method according to claim 14, wherein the determining of whether authentication with the smart key is successful comprises determining whether authentication with the smart key is successful based on a comparison between the authentication response time period and a pre-stored average response time period.

16. The method according to claim 15, wherein the determining of whether authentication with the smart key is successful comprises:
updating the average response time period based on the authentication response time period when the authentication response time period is less than or equal to the average response time period; and
determining whether authentication with the smart key is successful based on a comparison between the authentication response time period and a maximum response time period when the authentication response time period is greater than the average response time period.

17. The method according to claim 16, wherein:
the authentication request signal includes information about an RF communication channel, and
the determining of whether authentication with the smart key is successful comprises determining whether authentication with the smart key is successful, based on whether the authentication response signal has been transmitted through an RF communication channel corresponding to the information about the RF communication channel when the authentication response time period is greater than the maximum response time period.

18. The method according to claim 16, wherein:
the transmitting of the authentication request signal to the smart key comprises transmitting the authentication request signal with predetermined LF output intensity, and
the determining of whether authentication with the smart key is successful comprises determining whether authentication with the smart key is successful based on the LF output intensity and information about LF reception intensity included in the authentication response signal when the authentication response time period is less than or equal to the maximum response time period.

19. The method according to claim 18, further comprising updating the maximum response time period based on the authentication response time period when a difference between the LF output intensity and the LF reception intensity corresponding to the information about the LF reception intensity is less than or equal to a reference value.

20. The method according to claim 14, wherein:
the authentication request signal includes information about an RF communication channel,
the transmitting of the authentication request signal to the smart key comprises transmitting the authentication request signal with predetermined LF output intensity, and
the determining of whether authentication with the smart key is successful comprises determining whether authentication with the smart key is successful based on whether the authentication response signal has been transmitted through an RF communication channel corresponding to the information about the RF communication channel, and the LF output intensity and information about LF reception intensity included in the authentication response signal.

* * * * *